US007689238B2

(12) United States Patent
Biswas et al.

(10) Patent No.: US 7,689,238 B2
(45) Date of Patent: Mar. 30, 2010

(54) ARCHITECTURE AND IMPLEMENTATION OF CLOSED USER GROUPS AND LIMITING MOBILITY IN WIRELESS NETWORKS (75) Inventors: Deepankar Biswas, Bangalore (IN); Krishnakant M. Patel, Richardson, TX (US); Giridhar K. Boray, Plano, TX (US); Gorachand Kundu, Bangalore (IN)

(73) Assignee: Kodiak Networks, Inc., San Ramon, CA (US)

( * ) Notice: Subject to any disclaimer, the term of this patent is extended or adjusted under 35 U.S.C. 154(b) by 523 days.

(21) Appl. No.: 11/462,332

(22) Filed: Aug. 3, 2006

(65) Prior Publication Data
US 2007/0037597 A1 Feb. 15, 2007

Related U.S. Application Data (60) Provisional application No. 60/705,115, filed on Aug. 3, 2005.

(51) Int. Cl.
H04J 3/00 (2006.01)

(52) U.S. Cl. .................. 455/518; 455/428; 455/445; 455/560

(58) Field of Classification Search .......... 455/461, 455/413, 417, 565, 428, 445, 518, 560
See application file for complete search history.

(56) References Cited

U.S. PATENT DOCUMENTS

| 5,353,328 | A | 10/1994 | Jokimies |
| 5,442,809 | A | 8/1995 | Diaz et al. |
| 5,711,011 | A | 1/1998 | Urs et al. |
| 5,987,318 | A | 11/1999 | Alperovich et al. |
| 6,011,976 | A | 1/2000 | Michaels et al. |
| 6,021,326 | A | 2/2000 | Nguyen |
| 6,138,011 | A | 10/2000 | Sanders, III et al. |
| 6,304,558 | B1 | 10/2001 | Mysore |

(Continued)

FOREIGN PATENT DOCUMENTS

WO 00/79825 12/2000

(Continued)

OTHER PUBLICATIONS

ETSI: "ETSI TS 100 812-2 v2.3.1 Terrestrial Trunked Radio (TETRA) Subscriber Identity Module to Mobile Equipment (SIM-ME) Interface; Part 2: Universal Integrated Circuit Card (UICC) Characteristics of the TSIM Application," ETSI Technical Specification, Oct. 2003, pp. 1-141. XP002345779.

(Continued)

Primary Examiner—Kamran Afshar
Assistant Examiner—Ezana Getachew
(74) Attorney, Agent, or Firm—Gates & Cooper LLP (57) ABSTRACT A system for providing advanced voice services (AVS) in wireless communications systems includes a Real-Time Exchange (RTX) that interfaces to a wireless communications network to provide the AVS therein, wherein the AVS comprise Closed User Groups and Limiting Mobility. The Closed User Groups allow a group of users to make and receive calls only to other members of a group, and calls outside of the group are disallowed. The Limiting Mobility uses location information to restrict a mobile unit to service within one or more specified systems, cells or location areas.

26 Claims, 3 Drawing Sheets

U.S. PATENT DOCUMENTS

| | | | |
|---|---|---|---|
| 6,397,054 B1 | 5/2002 | Hoirup et al. | |
| 6,411,815 B1 | 6/2002 | Balasuriya | |
| 6,477,366 B1 | 11/2002 | Valentine et al. | |
| 6,549,773 B1 | 4/2003 | Linden et al. | |
| 6,628,937 B1* | 9/2003 | Salin | 455/413 |
| 6,661,878 B1 | 12/2003 | Mirashrafi et al. | |
| 6,751,468 B1 | 6/2004 | Heubel et al. | |
| 6,801,762 B1 | 10/2004 | Huilgol | |
| 6,856,676 B1* | 2/2005 | Pirot et al. | 379/201.01 |
| 6,895,254 B2 | 5/2005 | Dorenbosch | |
| 6,898,436 B2 | 5/2005 | Crockett et al. | |
| 7,099,291 B2 | 8/2006 | Harris et al. | |
| 7,170,863 B1 | 1/2007 | Denman et al. | |
| 7,231,225 B2 | 6/2007 | Rao et al. | |
| 7,366,535 B2 | 4/2008 | Glass et al. | |
| 7,403,775 B2 | 7/2008 | Patel et al. | |
| 2001/0005372 A1 | 6/2001 | Cave et al. | |
| 2002/0086659 A1 | 7/2002 | Lauper | |
| 2002/0196781 A1 | 12/2002 | Salovuori | |
| 2003/0016632 A1 | 1/2003 | Refai et al. | |
| 2003/0078064 A1 | 4/2003 | Chan | |
| 2003/0148779 A1 | 8/2003 | Aravamudan et al. | |
| 2003/0149774 A1 | 8/2003 | McConnell et al. | |
| 2003/0153343 A1 | 8/2003 | Crockett et al. | |
| 2003/0190888 A1 | 10/2003 | Mangal et al. | |
| 2004/0032843 A1 | 2/2004 | Schaefer et al. | |
| 2004/0057449 A1 | 3/2004 | Black | |
| 2004/0179531 A1* | 9/2004 | Bi et al. | 370/395.2 |
| 2004/0196826 A1 | 10/2004 | Bao et al. | |
| 2004/0259580 A1 | 12/2004 | Florkey et al. | |
| 2005/0111430 A1 | 5/2005 | Spear et al. | |
| 2005/0164737 A1 | 7/2005 | Brown | |
| 2005/0202807 A1 | 9/2005 | Ayyasamy et al. | |
| 2005/0221819 A1 | 10/2005 | Patel et al. | |
| 2005/0232241 A1 | 10/2005 | Wu et al. | |
| 2005/0239485 A1 | 10/2005 | Kundu et al. | |
| 2005/0254464 A1 | 11/2005 | Patel et al. | |
| 2005/0261016 A1 | 11/2005 | Patel et al. | |
| 2006/0019654 A1 | 1/2006 | Farrill | |
| 2006/0030347 A1 | 2/2006 | Biswaas | |
| 2006/0056361 A1 | 3/2006 | Jiang et al. | |
| 2006/0116150 A1 | 6/2006 | Bhutiani | |
| 2006/0189337 A1 | 8/2006 | Farrill et al. | |
| 2006/0234687 A1 | 10/2006 | Patel et al. | |
| 2007/0037597 A1 | 2/2007 | Biswas et al. | |
| 2007/0037598 A1 | 2/2007 | Ayyasamy et al. | |

FOREIGN PATENT DOCUMENTS

| | | |
|---|---|---|
| WO | 03/101007 | 12/2003 |
| WO | 2005/009006 | 1/2005 |
| WO | 2005/112494 | 11/2005 |
| WO | 2005/115032 | 12/2005 |
| WO | 2005/117474 | 12/2005 |
| WO | 2006/105287 | 10/2006 |

OTHER PUBLICATIONS

Nokia: What is TETRA? Why Nokia TETRA?, The Nokia TETRA Primer, 2002, pp. 1-29. XP002345778 http://www.nokia.com/downloads/solutions/government/SD114EN_gov.pdf.

Skype: "Skype." Web Archive—Skype, May 22, 2004, pp. 1-2. XP002345780 http://web.archive.org/web/20040522201727 http://www.skype.com.

Trachwell: "TrackWell Software and Tetra Iceland Deliver Value Added Services to Tetra Users," TRACKWELL.COM, Oct. 2002, p. 1. XP002345781 http://www.trackwell.com/news/news_twandtetra.htm.

* cited by examiner

ARCHITECTURE AND IMPLEMENTATION OF CLOSED USER GROUPS AND LIMITING MOBILITY IN WIRELESS NETWORKS

CROSS REFERENCE TO RELATED APPLICATIONS

This application claims the benefit under 35 U.S.C. Section 119(e) of the following co-pending and commonly-assigned patent application:

U.S. Provisional Application Ser. No. 60/705,115, filed on Aug. 3, 2005, by Biswas Deepankar, Krishnakant M. Patel, Giridhar K. Boray, and Gorachand Kundu, entitled "ARCHITECTURE AND IMPLEMENTATION OF CLOSED USER GROUP AND LIMITING MOBILITY IN WIRELESS NETWORKS,"

which application is incorporated by reference herein.

This application is related to the following co-pending and commonly-assigned patent applications:

U.S. Utility Application Ser. No. 10/515,556, filed Nov. 23, 2004, by Gorachand Kundu, Ravi Ayyasamy and Krishnakant Patel, entitled "DISPATCH SERVICE ARCHITECTURE FRAMEWORK," which application claims the benefit under 35 U.S.C. Section 365 of PCT International Patent Application Serial Number PCT/US03/16386, which application claims the benefit under 35 U.S.C. Section 119(e) of U.S. Provisional Patent Application Ser. Nos. 60/382,981, 60/383,179 and 60/407,168;

U.S. Utility Application Ser. No. 10/564,903, filed Jan. 17, 2006, by F. Craig Farrill, Bruce D. Lawler and Krishnakant M. Patel, entitled "PREMIUM VOICE SERVICES FOR WIRELESS COMMUNICATIONS SYSTEMS," which application claims the benefit under 35 U.S.C. Section 365 of PCT International Patent Application Serial Number PCT/US04/23038, which application claims the benefit under 35 U.S.C. Section 119(e) of U.S. Provisional Patent Application Ser. Nos. 60/488,638, 60/492,650 and 60/576,094 and which application is a continuation-in-part and claims the benefit under 35 U.S.C. Section 119, 120 and/or 365 of PCT International Patent Application Serial Number PCT/US03/16386;

U.S. patent application Ser. No. 11/126,587, filed May 11, 2005, by Ravi Ayyasamy and Krishnakant M. Patel, entitled "ARCHITECTURE, CLIENT SPECIFICATION AND APPLICATION PROGRAMMING INTERFACE (API) FOR SUPPORTING ADVANCED VOICE SERVICES (AVS) INCLUDING PUSH TO TALK ON WIRELESS MS 120 AND NETWORKS," which application claims the benefit under 35 U.S.C. Section 119(e) of U.S. Provisional Patent Application Ser. Nos. 60/569,953 and 60/579,309, and which application is a continuation-in-part and claims the benefit under 35 U.S.C. Sections 119, 120 and/or 365 of U.S. Utility patent application Ser. No. 10/515,556 and PCT International Patent Application Serial Number PCT/US04/23038;

U.S. Utility patent application Ser. No. 11/129,268, filed May 13, 2005, by Krishnakant M. Patel, Gorachand Kundu, Ravi Ayyasamy and Basem Ardah, entitled "ROAMING GATEWAY FOR SUPPORT OF ADVANCED VOICE SERVICES WHILE ROAMING IN WIRELESS COMMUNICATIONS SYSTEMS," which application claims the benefit under 35 U.S.C. Section 119(e) of U.S. Provisional Patent Application Ser. No. 60/571,075, and which application is a continuation-in-part and claims the benefit under 35 U.S.C. Sections 119, 120 and/or 365 of U.S. patent application Ser. No. 10/515,556 and P.C.T. International Patent Application Serial Number PCT/US04/23038;

U.S. Utility patent application Ser. No. 11/134,883, filed May 23, 2005, by Krishnakant Patel, Vyankatesh V. Shanbhag, Ravi Ayyasamy, Stephen R. Horton and Shan-Jen Chiou, entitled "ADVANCED VOICE SERVICES ARCHITECTURE FRAMEWORK," which application claims the benefit under 35 U.S.C. Section 119(e) of U.S. Provisional Patent Application Ser. Nos. 60/573,059 and 60/576,092, and which application is a continuation-in-part and claims the benefit under 35 U.S.C. Sections 119, 120 and/or 365 of U.S. Utility patent application Ser. No. 10/515,556, P.C.T. International Patent Application Ser. No. PCT/US04/23038, U.S. Utility patent application Ser. No. 11/126,587, and U.S. Utility patent application Ser. No. 11/129,268; and U.S. Utility patent application Ser. No. 11/136,233, filed May 24, 2005, by Krishnakant M. Patel, Vyankatesh Vasant Shanbhag, and Anand Narayanan, entitled "SUBSCRIBER INFORMATION MODULE (SIM) ENABLING ADVANCED VOICE SERVICES (AVS) INCLUDING PUSH TO TALK ON WIRELESS MS 120 AND NETWORKS," which application claims the benefit under 35 U.S.C. Section 119(e) of U.S. Provisional Patent Application Ser. No. 60/573,780,and which application is a continuation-in-part and claims the benefit under 35 U.S.C. Sections 119, 120 and/or 365 of U.S. Utility patent application Ser. No. 10/515,556, P.C.T. International Patent Application Serial Number PCT/US04/23038, Utility U.S. patent application Ser. No. 11/126,587, and Utility U.S. patent application Ser. No. 11/134,883;

U.S. Utility patent application Ser. No. 11/158,527, filed Jun. 22, 2005, by F. Craig Farrill, entitled "PRESS-TO-CONNECT FOR WIRELESS COMMUNICATIONS SYSTEMS," , which application claims the benefit under 35 U.S.C. Section 119(e) of U.S. Provisional Patent Application Ser. No. 60/581,954, and which application is a continuation-in-part and claims the benefit under 35 U.S.C. Sections 119, 120 and/or 365 of U.S. Utility patent application Ser. No. 10/515,556 and P.C.T. International Patent Application Ser. No. PCT/US04/23038;

U.S. Utility patent application Ser. No. 11/183,516, filed Jul. 18, 2005, by Deepankar Biswaas, entitled "VIRTUAL PUSH TO TALK (PTT) AND PUSH TO SHARE (PTS) FOR WIRELESS COMMUNICATIONS SYSTEMS," which application claims the benefit under 35 U.S.C. Section 119(e) of U.S. Provisional Patent Application Ser. No. 60/588,464; and Utility U.S. patent application Ser. No. 11/356,775, filed Feb. 17, 2006, by Krishnakant M. Patel, Bruce D. Lawler, Giridhar K. Boray, and Brahmananda R. Vempati, entitled "ENHANCED FEATURES IN AN ADVANCED VOICE SERVICES (AVS) FRAMEWORK FOR WIRELESS COMMUNICATIONS SYSTEMS," which application claims the benefit under 35 U.S.C. Section 119(e) of U.S. Provisional Patent Application Ser. No. 60/654,271;

PCT International Patent Application Serial Number PCT/US2006/011628, filed Mar. 30, 2006, by Krishnakant M. Patel, Gorachand Kundu, Sameer Dharangaonkar, Giridhar K. Boray, and Deepankar Biswas, entitled "TECHNIQUE FOR IMPLEMENTING ADVANCED VOICE SERVICES USING AN UNSTRUCTURED SUPPLEMENTARY SERVICE DATA (USSD) INTERFACE," which application claims the benefit under 35 U.S.C. Section 119(e) of U.S. Provisional Patent Application Ser. No. 60/666,424;

all of which applications are incorporated by reference herein.

BACKGROUND OF THE INVENTION

1. Field of the Invention

This invention relates in general to wireless communications systems, and more specifically, to enabling Closed User Groups (CUGs) and Limiting Mobility in wireless communications systems.

2. Description of Related Art

Group-based voice services, such as two-way half-duplex voice calls within a group or between individuals, also known as "Push-to-Talk," "Press-to-Talk," PTT or P2T, have enormous revenue earnings potential for wireless networks, such as cellular networks and personal communications systems (PCS) networks.

Moreover, the Assignee has introduced Advanced Voice Services (AVS) including improved implementations for P2T, as well as novel group-based voice services such as Push-to-Conference (P2C) (also known as Conference Call), Upgrade to Conference (upgrade from P2T to P2C), Push-to-Message (P2M) (also known as Instant Voice Messaging or IVM) and group SMS (Short Message Service), for wireless mobile units or handsets and networks. More information on these advanced voice services can be found in the cross-referenced applications identified above.

Notwithstanding these innovations, there is a need in the art for other advanced voice services that comply with existing and emerging wireless standards and provide superior user experiences. The present invention aims to satisfy this need by providing enhanced features in advanced voice services for wireless communications systems.

SUMMARY OF THE INVENTION

To overcome the limitations in the prior art described above, and to overcome other limitations that will become apparent upon reading and understanding the present specification, the present invention discloses a system for providing advanced voice services (AVS) in wireless communications systems. In this system, a Real-Time Exchange (RTX) interfaces to a wireless communications network to provide the AVS therein, wherein the AVS comprise Closed User Groups and Limiting Mobility. The Closed User Groups allow a group of users to make and receive calls only to other members of a group, and calls outside of the group are disallowed. The Limiting Mobility uses location information to restrict a mobile unit to service within one or more specified systems, cells or location areas.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Overview

The present invention discloses the concept of Closed User Groups (CUGs) for Advanced Voice Services (AVS) in wireless communications networks. CUGs allow a group of users to make and receive calls only within the group, wherein calls in or out of the group may be disallowed, except for specified members under specified conditions.

The present invention also discloses the concept of Limiting Mobility for Advanced Voice Services (AVS) in wireless communications networks. This functionality uses location information to restrict the mobility of a handset to within one or more specified systems, cells or location areas.

Network Architecture

Figure 1:
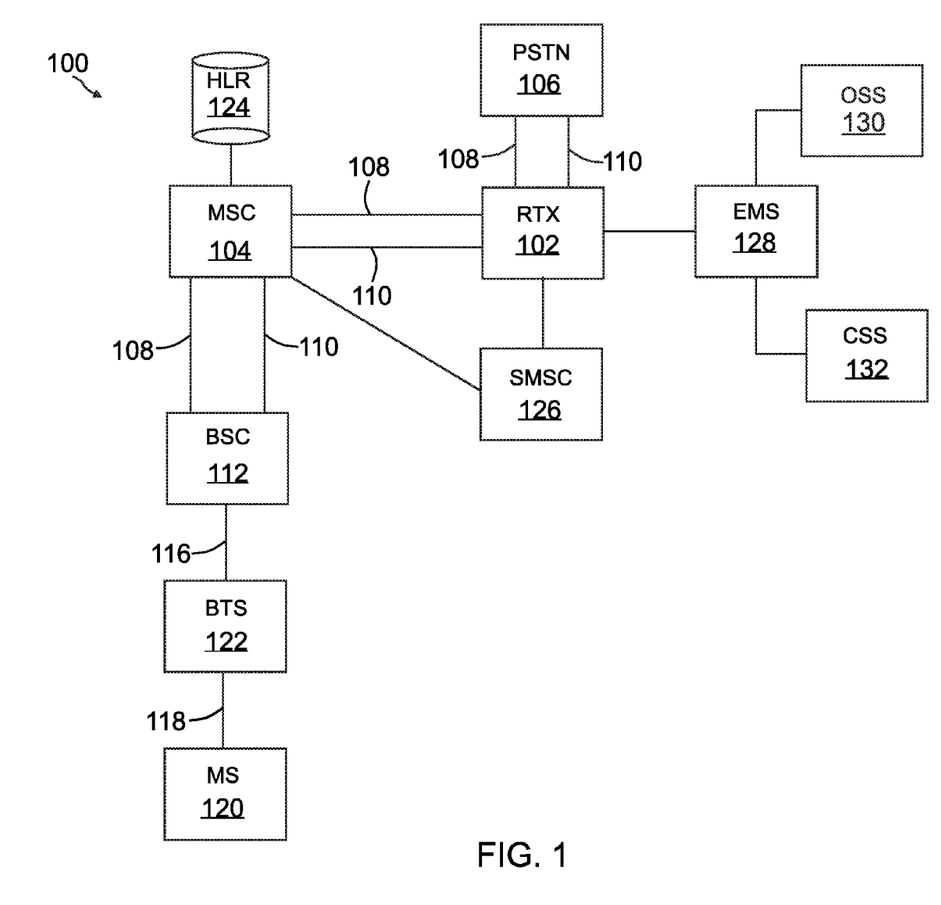
FIG. 1 is a block diagram that illustrates an exemplary embodiment of a wireless communications network according to a preferred embodiment of the present invention.

FIG. 1 is a block diagram that illustrates an exemplary embodiment of a wireless communications network according to a preferred embodiment of the present invention.

Within the network 100, an RTX (Real-Time Exchange) 102, previously known as a Dispatch Gateway (DG), communicates with a MSC (Mobile Switching Center) 104 and PSTN (Public Switched Telephone Network) 106 using SS7—ISUP/WIN/CAMEL/MAP (Signaling System 7—Integrated Services Digital Network User Part/Wireless Intelligent Network/Customized Applications for Mobile Enhanced Logic/Mobile Application Part) messages at a signaling plane 108. A bearer path 110 implements a TDM (Time Division Multiplexing) interface carrying PCM (Pulse Code Modulation) or TFO (Tandem Free Operation) voice frames.

When an AVS subscriber originates an AVS call, the MSC 104 routes the call to the RTX 102. The MSC 104 also requests the BSC 112 via 116 to establish a radio traffic path 118 with a mobile station (MS) 120 (also known as a handset or mobile unit) via the BTS (Base Transceiver Station) 122 (as it does for a normal cellular call). At this time, the BSC 112 tries to negotiate TFO (if it is supported) or PCM on a TDM link with the far end (in this case, the RTX 102).

At the same time (after the MSC 104 terminates the AVS call request to the RTX 102), the RTX 102 identifies the terminating users and their MS-ISDN (Mobile Station-Integrated Services Digital Network) numbers (also known as Mobile Directory Numbers or MDNs). It sends an ISUP call origination request for each terminating MS 120. It may send requests directly to the MSC 104, PSTN 106 or other terminating network, depending on the routing table configuration for terminating MS-ISDN numbers. Once the bearer path 110 is established, the RTX 102 begins a negotiation with the far end (e.g., the terminating BSC 112) for each terminating leg to a MS 120.

Once bearer paths 110 are established for originating and terminating legs for an AVS call, the RTX 102 switches (or duplicates) voice frames between the originating MS 120 and terminating MS 120.

The RTX 102 may use various other networks, such as an IP network or the Internet/Intranet, for various other purposes. For example, these networks may be used in a toll bypass mode where two RTXs 102 can exchange voice traffic bypassing the PSTN 106. In another example, these networks may be used for registration and presence applications.

Since the MSC 104 will not direct a registration request from a MS 120 to the RTX 102 (because it would require changes in the MSC 104), the latter does not have any information of the registered MS 120. To circumvent this issue, a registration and presence application executes in the MS 120 and registers with the RTX 102, after establishing a communication path with the RTX 102. The RTX 102 also uses this path to update the presence information in group members' MS 120 with the network 100 availability of the MS 120 of other members of the group.

During roaming, a Home Location Register (HLR) 124 can be accessed via the MSC 104. The HLR 124 can be used to track the presence of group members' MS 120 within the network 100 and updates the group members' MS 120 with the network 100 availability of the MS 120 of other members of the group.

In one embodiment, the SMS (Short Message Service) transport is used to carry messages between the RTX 102 and the MS 120. Messages are communicated between the MS 120 and a SMSC (Short Message Service Center) gateway 126 and between the SMSC gateway 126 and the RTX 102.

Finally, three systems are used by the wireless network 100 operator to manage the wireless network 100, including an Element Management System (EMS) 128 that maintains network 100 and MS 120 profiles, settings and parameters, an Operational Support System (OSS) 130 that provides operational and maintenance support for subscribers of the wireless network 100 and a Customer Support System (CSS) 132 that provides customer support for the wireless network 100. These systems 128, 130 and 132 work together to manage the wireless network 100 and MS 120, as described in more detail below.

Real Time Exchange

Figure 2:
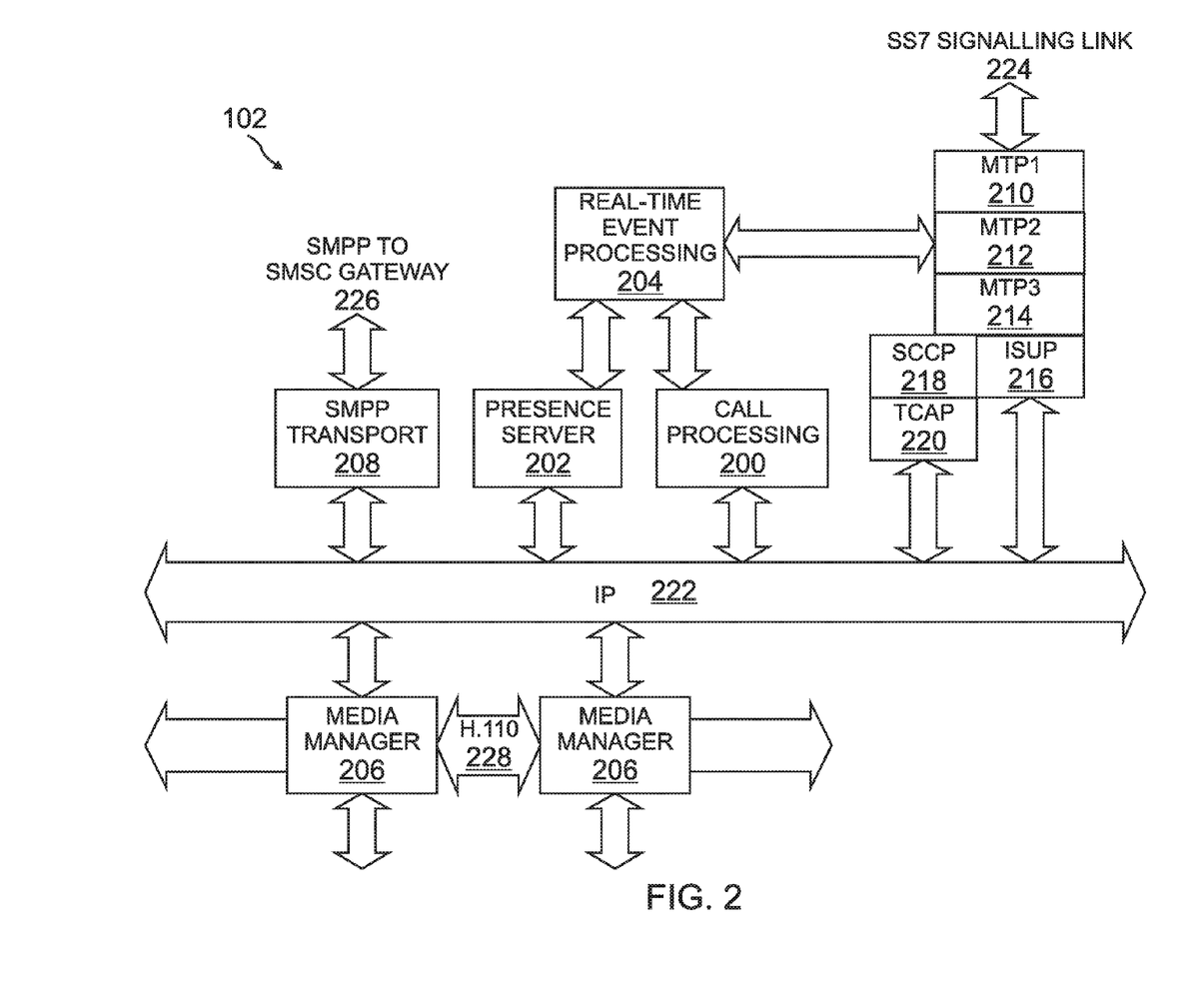
FIG. 2 illustrates a proposed architecture for a real-time exchange according to the preferred embodiment of the present invention.

FIG. 2 illustrates a proposed architecture for the RTX 102 according to the preferred embodiment of the present invention.

The architecture includes a Call Processing system 200, Presence Server 202, Real-Time Event Processing system 204, one or more Media Managers 206, and an SMPP (Short Message Peer-to-Peer) Transport 208, as well as modules for various SS7 protocols, such as MTP-1 (Message Transfer Part Level 1) 210, MTP-2 (Message Transfer Part Level 2) 212, MTP-3 (Message Transfer Part Level 3) 214, ISUP (Integrated Services Digital Network User Part) 216, SCCP (Signaling Connection Control Part) 218, and TCAP (Transactions Capabilities Application Part) 220 protocols.

The Call Processing system 200, Presence Server 202, Media Managers 204, SMPP Transport 206, and other modules communicate across an IP network 222. The Real-Time Event Processing system 204 communicates directly with the Call Processing system 200, Presence Server 202, and the modules for various SS7 protocols. The modules for various SS7 protocols communicate with other entities via a SS7 Signaling Link 224. The SMPP Transport 206 communicates with a SMSC (Short Message Service Center) 126 using the SMPP protocol 226. The Media Managers 204 communicate among themselves using the H.110 protocol 228 (or some other protocol, such TCP/IP).

The operation of these various components are described in more detail below, as well as in the co-pending and commonly-assigned patent applications cross-referenced above and incorporated by reference herein.

The originating MS 120 signals the RTX 102 via the wireless network 100, e.g., by transmitting one or more configured DTMF (Dual Tone Multi Frequency) digits to the RTX 102. The Media Manager systems 206 receive the DTMF digits and pass the DTMF digits to the Call Processing system 200. The Call Processing (CP) system 200 determines whether the originating MS 120 has subscribed to the AVS feature before originating the AVS call. The Call Processing system 200 also determines whether the originating MS 120 and terminating MS 120 have sufficient privileges before originating or terminating the call. Upon confirmation, the Call Processing system 200 initiates a new AVS call. The Call Processing system 200 interacts with the Presence Server 202 and Real-Time Event Processing system 204 to cause the wireless network 100 to perform call setup with the terminating MS 120 for the AVS call, and thereafter to manage the AVS call.

During the AVS call, the Call Processing system 200 interacts with the Media Manager systems 206 to maintain the H.110 channels 228 and assign any additional H.110 channels 228 required for the AVS call, which may span across multiple Media Manager systems 206. During the AVS call, the Media Manager systems 206 of the RTX 102 are used to mix audio streams between the originating MS 120 and the terminating MS 120, and then deliver these mixed audio streams to the originating MS 120 and the terminating MS 120. The H.110 channels 228 are used for passing mixed and unmixed audio streams voice between the Media Manager systems 200 as required.

Closed User Groups

Closed User Groups (CUGs) allow a group of users to make and receive calls only within a group identified by a Group Id (also known as a Corporate Id). However, calls in or out of the group are generally disallowed, except for specified members under specified conditions.

CUGs usually are created by an Administrator via the EMS 128, OSS 130 or CSS 132, which in turn updates the RTX 102. The Administrator has sufficient privileges to add and delete users and groups, with the MDN as the identifier, and to specify the type of privileges for each member of the group.

For example, in one embodiment, a CUG is comprised of members having "Normal" and "Manager" privileges. In one embodiment, the Normal privilege member is allowed to make and receive intra-CUG calls only, but is not allowed to make or calls outside the CUG (i.e., no incoming or outgoing calls). In another embodiment, the Normal privilege member is allowed to make and receive intra-CUG calls, and is allowed to receive calls from outside the CUG, but is not allowed to make calls outside the CUG (i.e., no outgoing calls). The Manager privilege member is allowed to make and receive intra-CUG calls, as well as make and receive calls outside the CUG (i.e., can make both incoming and outgoing calls).

Once provisioned with the CUGs, call attempts from the group members are directed by the MSC 104 to the RTX 102 based on an Origination Trigger. Incoming calls are routed from the terminating MSC 104 to the RTX 102 using a Termination Trigger.

The RTX 102 determines whether the call is to be allowed or not (depending on the member privileges). In this regard, the RTX 102 performs both calling party and called party analysis before deciding to allow or disallow a call.

Note that, in one embodiment, group members need only enter a short code, less than the MDNs (e.g., 333), to identify and call other members in the group.

Note also that the RTX 102 may also support roaming by CUG members.

Call Flow for CUG Call Processing

Figure 3:
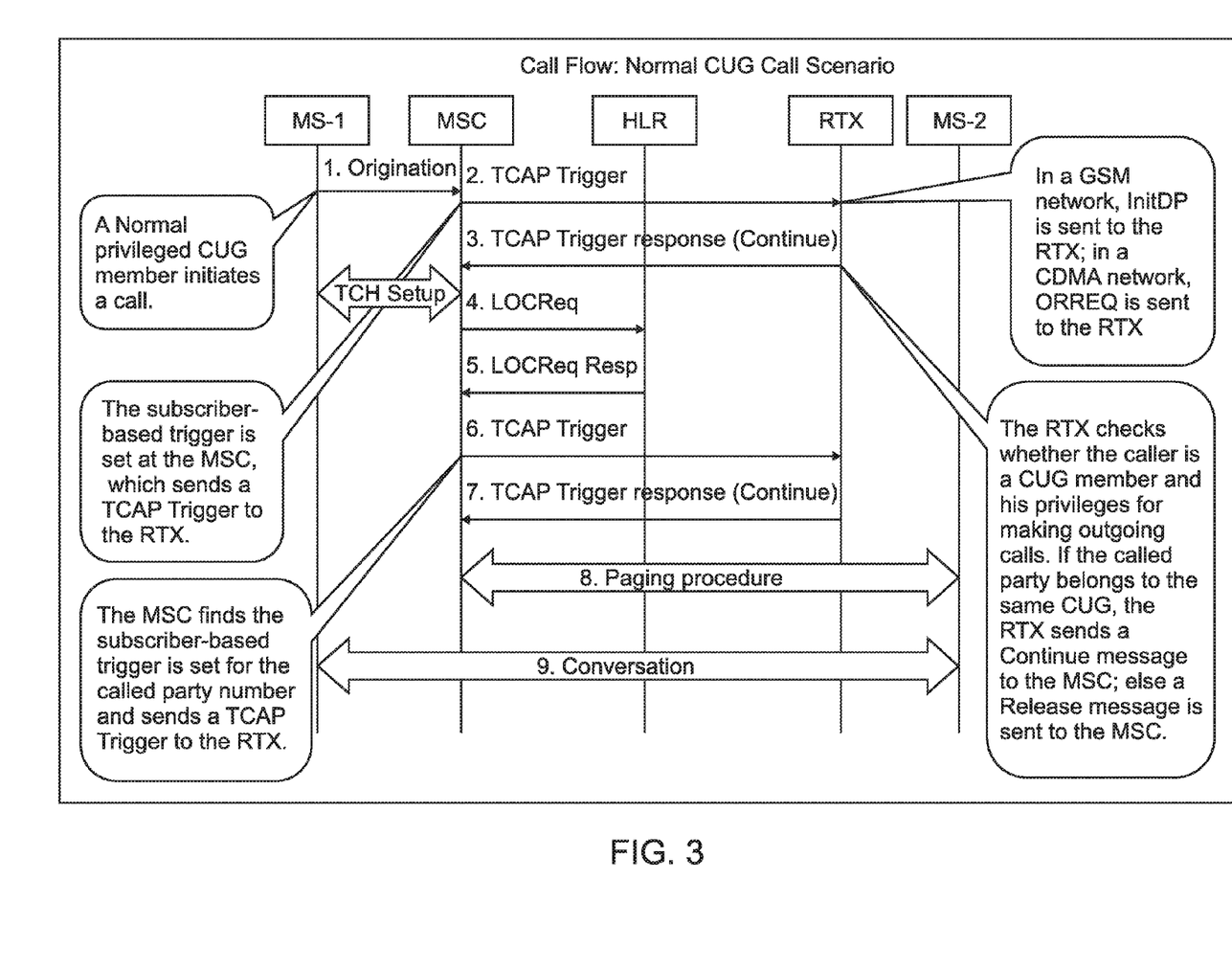
FIG. 3 is a diagram that illustrates the call flow of a call in a Closed User Group, according to a preferred embodiment of the present invention.

FIG. 3 is a diagram illustrating the call flow for a Normal privilege member calling a Normal or Manager privilege member.

1. The CUG member originates a call at MS-1 120 by dialing the called party number.

2. A subscriber-based trigger is set at the MSC 104, wherein the MSC 104 sends a Transaction Capabilities Application Part (TCAP) trigger message to the RTX 102, when the trigger criteria are met. The message includes both the calling party number and called party number.

3. The RTX 104 analyses the calling party digits and identifies the CUG Id of the calling party by querying a member information table. If the CUG Id of the calling party is found, the RTX 102 queries a Location Server (not shown) to find the home RTX 102 of the called party (from the dialed digits) in order to ensure that the called party number belongs to the same CUG. If the calling and called parties belong to the same CUG, then the RTX 102 sends a "Continue" message to the MSC 104; otherwise, the RTX 102 sends a "Release" message to the MSC 104.

4. If the MSC 104 receives a "Continue" message, it proceeds with the call processing, which includes a Traffic Channel (TCH) Setup with MS-1 120; otherwise, if the MSC 104 receives a "Release" message, it ends the call attempt. The MSC 104 initiates a Location Request (LOCReq) to the HLR 124, in order to retrieve the service profiles for both the called and calling parties.

5. The HLR 124 responds to the LOCReq with a Location Request Response (LOCReq Resp) to the MSC 104, which includes the service profiles for both the called and calling parties.

6. The MSC 104 sends another TCAP trigger message to the RTX 102, wherein the message includes the service profiles for both the calling party number and called party number.

7. The RTX 102 ensures that the called party is in the same CUG from the member profile and does the following checks. If the CUG Id of the called party is found, the RTX 102 queries the Location Server to find the home RTX 102 of the calling party (from calling party digits) in order to ensure that the calling party number belongs to the same CUG. If the caller and called parties belong to the same CUG, the RTX 102 sends a "Continue" message to the MSC 104; otherwise, the TX 102 sends a "Release" message to the MSC 104.

7. If the MSC 104 receives a "Continue" message, it processes the call processing; otherwise, if the MSC 104 receives a "Release" message, it ends the call attempt.

8. The MSC 104 initiates a paging procedure for the MS-2 120.

9. The MS-1 120 is connected to the MS-2 120, and the conversation proceeds.

Use Cases for a CUG Member Having Normal Privileges

The following describes the use cases for a CUG member having normal privileges.

A CUG Member (Normal Privileges) Attempts an Intra-CUG Call (Abbreviated Dialing)

1. A CUG member having normal privileges initiates an intra-CUG call by dialing a short dial code of a terminating party who is another member of the same CUG.

2. The call is connected to the terminating party.

3. The member hears terminating party ringing.

4. The member is able to have a conversation with the terminating party.

A CUG Member (Normal Privileges) Attempts a Call Outside the CUG (Full MDN Dialing)

1. A CUG member having normal privileges attempts a call to a terminating party outside of the CUG. 2. The member hears a Call Reject-Tone and the call is dropped.

A CUG Member (Normal Privileges) Attempts an Intra-CUG Call (Full MDN Dialing)

1. A CUG member having normal privileges initiates an intra-CUG call by dialing the full MDN of a terminating party who is another member of the same CUG.

2. The call is connected to the terminating party.

3. The member hears terminating party ringing.

4. The member is able to have a conversation with the terminating party.

A CUG Member (Normal Privileges) is Roaming and Attempts an Intra-CUG Call (Any Dialing)

1. A CUG member having normal privileges initiates an intra-CUG call to a terminating party who is another member of the same CUG while roaming.

2. The call is connected to the CUG member.

3. The member hears terminating party ringing.

4. The member is able to have a conversation with the terminating party.

A CUG Member (Normal Privileges) is Roaming and Attempts a Call Outside the CUG

1. A CUG member having normal privileges initiates a call a terminating party who is not a member of the same CUG while roaming.

2. The member hears a Call-Reject-Tone and the call is dropped.

There is an Incoming Call to a CUG Member with Normal Privileges

1. The call does not get connected to the CUG member.

2. The originator hears a Call-Reject-Tone or Call-Drop-Tone.

Use Cases for a CUG Member having Manager Privileges

The following describes use cases for a CUG member having manager privileges.

A CUG Member (Manager Privileges) Attempts an Intra-CUG Call (Abbreviated Dialing)

1. A CUG member having manager privileges initiates an intra-CUG call by dialing a short dial code of a terminating party who is another member of the same CUG.

2. The call is connected to the terminating party.

3. The member hears terminating party ringing.

4. The member is able to have a conversation with the terminating party.

A CUG Member (Manager Privileges) Attempts a Call Outside the CUG (Full MDN Dialing)

1. A CUG member having manager privileges attempts a call to a terminating party who is not a member of the same CUG.

2. The call is connected to the terminating party.

3. The member hears terminating party ringing.

4. The member is able to have a conversation with the terminating party.

A CUG Member (Manager Privileges) Attempts an Intra-CUG Call (Full MDN Dialing)

1. A CUG member having manager privileges initiates an intra-CUG call by dialing the full MDN of a terminating party who is another member of the same CUG.

2. The call is connected to the terminating party.

3. The member hears terminating party ringing.

4. The member is able to have a conversation with the terminating party.

A CUG Member (Manager Privileges) is Roaming and Attempts an Intra-CUG Call (Any Dialing)

1. A CUG member having manager privileges initiates an intra-CUG call to a terminating party who is another member of the same CUG while roaming.

2. The call is connected to the terminating party.

3. The member hears terminating party ringing.

4. The member is able to have a conversation with the terminating party.

A CUG Member (Manager Privileges) is Roaming and Attempts a Call Outside the CUG 1. A CUG member having manager privileges initiates a call to a terminating party who is not a member of the same CUG while roaming.

2. The call is connected to the terminating party.

3. The member hears terminating party ringing.

4. The member is able to have a conversation with the terminating party.

There is an Incoming Call to a CUG Member with Manager Privileges

1. The call is connected to the CUG member.

2. The originator hears ringing.

3. The originator is able to have a conversation with the CUG member.

Limiting Mobility

The Limiting Mobility functionality provided by the RTX 102 relates to a general position determination for subscribers. Specifically, the RTX can obtain the following location information regarding the MS 120:

The identity of the system serving the MS 120.

The identity of the cell serving the MS 120.

The identity of the location area serving the MS 120.

Additional location information that may be provided to the RTX 102 can include the following attributes of the MS 120:

Geographic position (M),

Specifies position in Latitude, Longitude and Altitude,

Generalized Time (M),

Position Source (O),

Horizontal Velocity (O), and

Vertical Velocity (O).

Using this location information, the RTX 120 may restrict the mobility of the MS 120 within a system, cell or location area. For example, an area can be defined for a subscriber within which he would be allowed service, and out of which he would be barred service. This home area could be a combination of one or more systems, cells or a location area identity.

The RTX 102 can determine the location information by communicating with the HLR 124 using MAP version 3 specifications (MAPv3). Once the location information is obtained by the RTX 102, it will take an action on limiting the mobility of the MS 120 as applicable.

The RTX 102 fetches the location information of either or both the originating and terminating MS 120 when a call is attempted. The RTX 102 checks the location information against configured mobility information in making the decision on whether to allow or bar the call.

For the originating MS 120, this location information will be up-to-date, since, when a call is being attempted, the MS 120 would had already been paged, and the latest location information would be available with the serving HLR 124 or MSC 104.

For the terminating MS 120, the RTX 102 can fetch the last known position or ask for the latest location information before barring or allowing the call.

Conclusion

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An apparatus for providing advanced voice services in a wireless communications network, comprising:

a wireless communications network for making calls to and from mobile units, wherein the calls are initiated by call setup and in-band signaling within the wireless communications network and voice frames for the calls are switched between the mobile units across bearer paths in the wireless communications network; and a real-time exchange that interfaces to at least one mobile switching center in the wireless communications network to provide the advanced voice services therein, without requiring any changes to the mobile switching center or other equipment of the wireless communications network to provide the advanced voice services, wherein the advanced voice services comprise Closed User Groups (CUGs) that allow a group of users to make and receive calls only to other members of the group of users, and calls outside of the group of users are disallowed;

wherein both the real-time exchange and the mobile units that use the advanced voice services communicate with each other using the call setup and in-band signaling within the wireless communications network to provide the advanced voice services for the mobile units, such that at least one mobile switching center routes an originating leg of the advanced voice services from an originating mobile unit to the real-time exchange, the real-time exchange initiates one or more terminating legs of the advanced voice services to one or more terminating mobile units through at least one mobile switching center, and the real-time exchange switches the voice frames for the advanced voice services from the originating mobile unit to the terminating mobile units across the bearer paths and through at least one mobile switching center.

2. The apparatus of claim 1, wherein the members of the group need only enter a short code, less than a mobile directory number, to identify and call other members of the group.

3. The apparatus of claim 1, wherein the group is identified by a Group Id.

4. The apparatus of claim 1, wherein calls outside of the group are disallowed, except for specified members under specified conditions.

5. The apparatus of claim 1, wherein a CUG is comprised of members having Normal and Manager privileges.

6. The apparatus of claim 5, wherein a Normal privilege member is allowed to make and receive intra-CUG calls only, but is not allowed to make or receive calls outside the CUG.

7. The apparatus of claim 5, wherein a Normal privilege member is allowed to make and receive intra-CUG calls, and is allowed to receive calls outside the CUG, but is not allowed to make calls outside the CUG.

8. The apparatus of claim 5, wherein a Manager privilege member is allowed to make and receive intra-CUG calls, as well as make and receive calls outside the CUG.

9. An apparatus for providing advanced voice services in a wireless communications network, comprising:

a wireless communications network for making calls to and from mobile units, wherein the calls are initiated by call setup and in-band signaling within the wireless communications network and voice frames for the calls are switched between the mobile units across bearer paths in the wireless communications network; and a real-time exchange that interfaces to at least one mobile switching center in the wireless communications network to provide the advanced voice services therein, wherein the advanced voice services comprise limiting mobility for the mobile units using location information regarding the mobile units, thereby restricting a mobile unit to service within one or more specified systems, cells or location areas;

wherein both the real-time exchange and the mobile units that use the advanced voice services communicate with each other using the call setup and in-band signaling within the wireless communications network to provide the advanced voice services for the mobile units.

10. The apparatus of claim 9, wherein the location information comprises an identity of a system serving the mobile unit, an identity of a cell serving the mobile unit, and an identity of a location area serving the mobile unit.

11. The apparatus of claim 9, wherein the advanced voice services limit the mobility for the mobile units using location information regarding the mobile units to restrict the mobile unit to a combination of one or more specified systems, cells or location areas.

12. The apparatus of claim 9, wherein the location information is provided by a home location register.

13. The apparatus of claim 9, wherein the location information is compared against configured mobility information in determining whether to allow or bar a call by the mobile unit.

14. A method for providing advanced voice services in a wireless communications network, comprising:
    making calls to and from mobile units in a wireless communications network, wherein the calls are initiated by call setup and in-band signaling within the wireless communications network and voice frames for the calls are switched between the mobile units across bearer paths in the wireless communications network; and
    interfacing a real-time exchange to at least one mobile switching center in the wireless communications network to provide the advanced voice services therein, without requiring any changes to the mobile switching center or other equipment of the wireless communications network to provide the advanced voice services, wherein the advanced voice services comprise Closed User Groups (CUGs) that allow a group of users to make and receive calls only to other members of the group of users, and calls outside of the group of users are disallowed;
    wherein both the real-time exchange and the mobile units that use the advanced voice services communicate with each other using the call setup and in-band signaling within the wireless communications network to provide the advanced voice services for the mobile units, such that at least one mobile switching center routes an originating leg of the advanced voice services from an originating mobile unit to the real-time exchange, the real-time exchange initiates one or more terminating legs of the advanced voice services to one or more terminating mobile units through at least one mobile switching center, and the real-time exchange switches the voice frames for the advanced voice services from the originating mobile unit to the terminating mobile units across the bearer paths and through at least one mobile switching center.

15. The method of claim 14, wherein the members of the group need only enter a short code, less than a mobile directory number, to identify and call other members of the group.

16. The method of claim 14, wherein the group is identified by a Group Id.

17. The method of claim 14, wherein calls outside of the group are disallowed, except for specified members under specified conditions.

18. The method of claim 14, wherein a CUG is comprised of members having Normal and Manager privileges.

19. The method of claim 18, wherein a Normal privilege member is allowed to make and receive intra-CUG calls only, but is not allowed to make or receive calls outside the CUG.

20. The method of claim 18, wherein a Normal privilege member is allowed to make and receive intra-CUG calls, and is allowed to receive calls outside the CUG, but is not allowed to make calls outside the CUG.

21. The method of claim 18, wherein a Manager privilege member is allowed to make and receive intra-CUG calls, as well as make and receive calls outside the CUG.

22. A method for providing advanced voice services in a wireless communications network, comprising:
    making calls to and from mobile units in a wireless communications network, wherein the calls are initiated by call setup and in-band signaling within the wireless communications network and voice frames for the calls are switched between the mobile units across bearer paths in the wireless communications network; and
    interfacing a real-time exchange to at least one mobile switching center in the wireless communications network to provide the advanced voice services therein, wherein the advanced voice services comprise limiting mobility for the mobile units using location information regarding the mobile units, thereby restricting a mobile unit to service within one or more specified systems, cells or location areas;
    wherein both the real-time exchange and the mobile units that use the advanced voice services communicate with each other using the call setup and in-band signaling within the wireless communications network to provide the advanced voice services for the mobile units.

23. The method of claim 22, wherein the location information comprises an identity of a system serving the mobile unit, an identity of a cell serving the mobile unit, and an identity of a location area serving the mobile unit.

24. The method of claim 22, wherein the advanced voice services limit the mobility for the mobile units using location information regarding the mobile units to restrict the mobile unit to a combination of one or more specified systems, cells or location areas.

25. The method of claim 22, wherein the location information is provided by a home location register.

26. The method of claim 22, wherein the location information is compared against configured mobility information in determining whether to allow or bar a call by the mobile unit.

* * * * *